(12) United States Patent
Zimmel

(10) Patent No.: US 7,505,663 B2
(45) Date of Patent: Mar. 17, 2009

(54) FIBER OPTIC FURCATION DEVICE INCLUDING EXPANSION CHAMBER

(75) Inventor: Steve Zimmel, Minneapolis, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 85 days.

(21) Appl. No.: 11/064,164

(22) Filed: Feb. 23, 2005

(65) Prior Publication Data

US 2006/0188210 A1   Aug. 24, 2006

(51) Int. Cl.
G02B 6/00 (2006.01)

(52) U.S. Cl. .................................... 385/135

(58) Field of Classification Search .............. None
See application file for complete search history.

(56) References Cited

U.S. PATENT DOCUMENTS

| | | |
|---|---|---|
| 5,069,516 A | 12/1991 | Koby et al. |
| 5,093,886 A | 3/1992 | Smoker et al. |
| 5,189,724 A | 2/1993 | Hartley |
| 5,235,665 A | 8/1993 | Marchesi et al. |
| 5,261,024 A | 11/1993 | Allen et al. |
| 5,740,295 A | 4/1998 | Kinard et al. |
| 5,758,004 A * | 5/1998 | Alarcon et al. ............. 385/135 |
| 6,618,538 B2 | 9/2003 | Nechitailo et al. |
| 6,801,695 B2 | 10/2004 | Lanier et al. |
| 6,829,424 B1 | 12/2004 | Finzel et al. |
| 6,885,798 B2 | 4/2005 | Zimmel |
| 6,926,449 B1 | 8/2005 | Keenum et al. |
| 2002/0061231 A1 | 5/2002 | Finzel et al. |
| 2002/0117572 A1 | 8/2002 | Nechitailo et al. |
| 2002/0145069 A1 | 10/2002 | Nechitailo et al. |
| 2005/0207711 A1 | 9/2005 | Vo et al. |

FOREIGN PATENT DOCUMENTS

| | | |
|---|---|---|
| DE | 199 40 432 A1 | 4/2001 |
| EP | 0 875 015 B1 | 10/1999 |

OTHER PUBLICATIONS

Declaration of Steven C. Zimmel dated Mar. 25, 2004 from the file history of U.S. 6,885,798.
Exhibit I, Copy of Photograph displaying a cluster of fiber optic splitters labeled "A".
Exhibit II, FOnetworks, Inc. FOnetworks 6 and 12 Fiber Ribbon Fanout Assemblies; 3 page total.

* cited by examiner

Primary Examiner—Kevin S. Wood
(74) Attorney, Agent, or Firm—Merchant & Gould P.C.

(57) ABSTRACT

An optical fiber device with an optical fiber extending from a first outer jacket through a fiber receiving device from a first outer jacket to a second outer jacket. The first outer jacket is anchored to a side of a housing of the fiber receiving device and the second outer jacket is anchored to a side of the fiber receiving device. The housing defines an interior which received the optical fiber and provides space for accumulating excess length of optical fiber generated by differential thermal contraction of the jackets and the optical fiber.

8 Claims, 17 Drawing Sheets

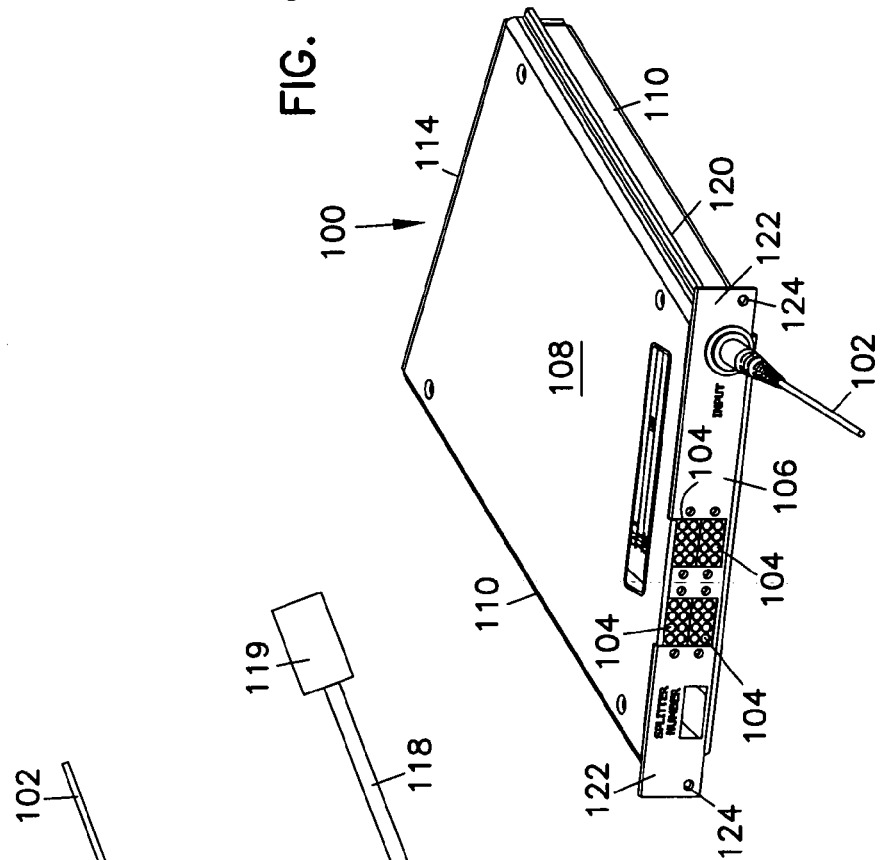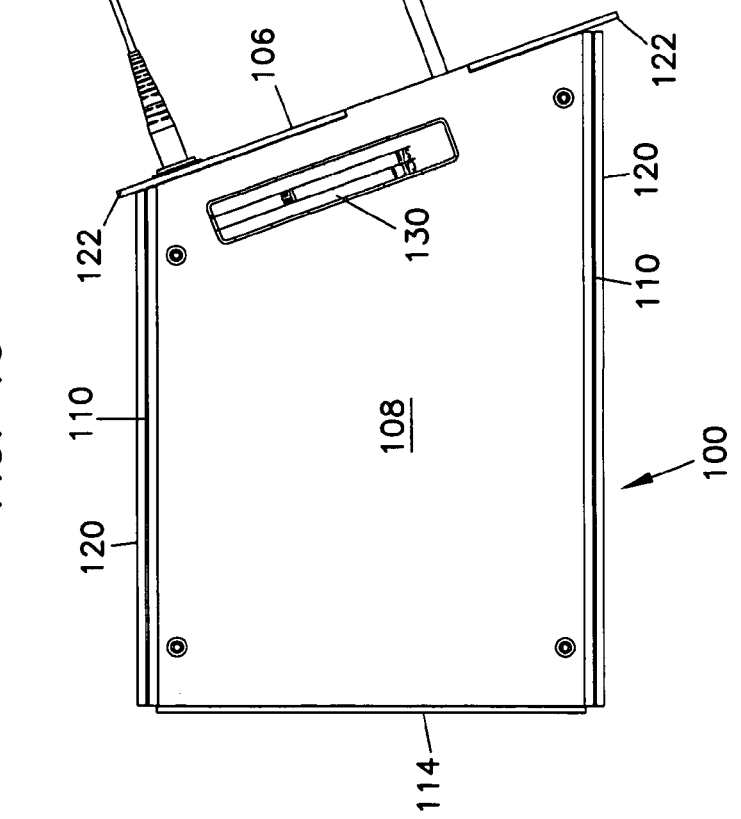

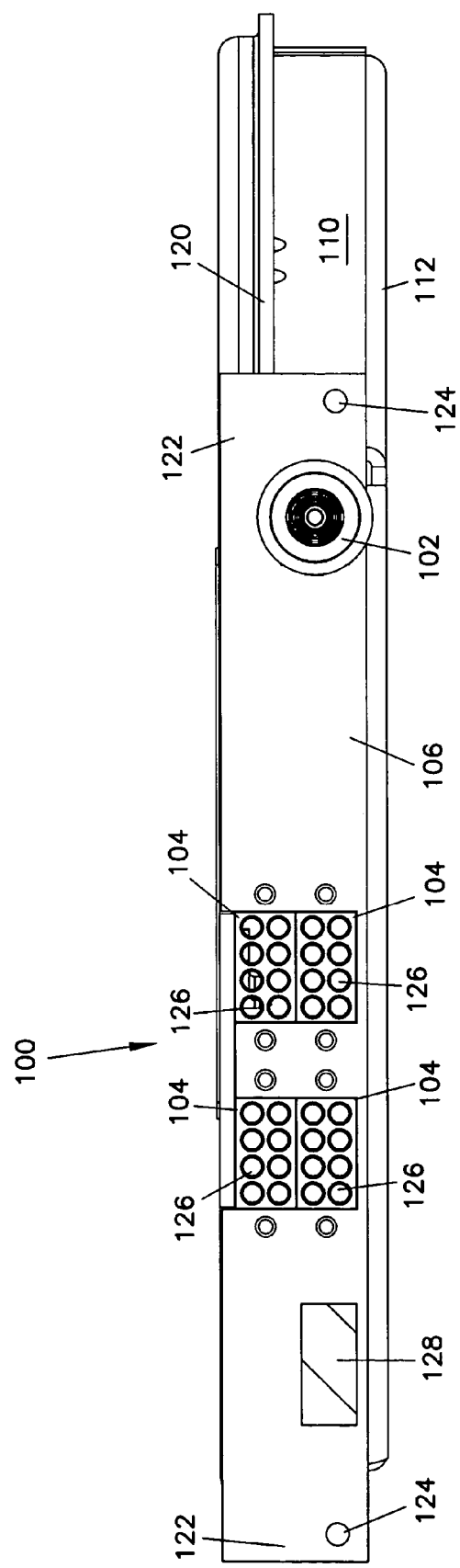

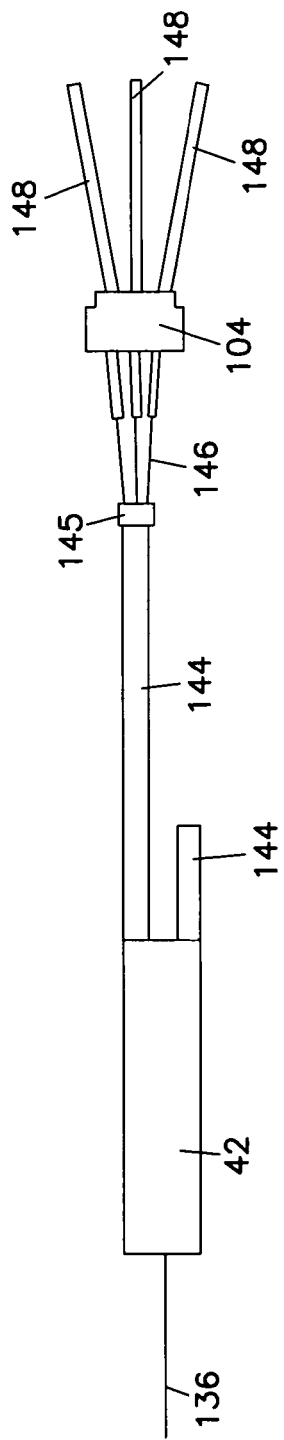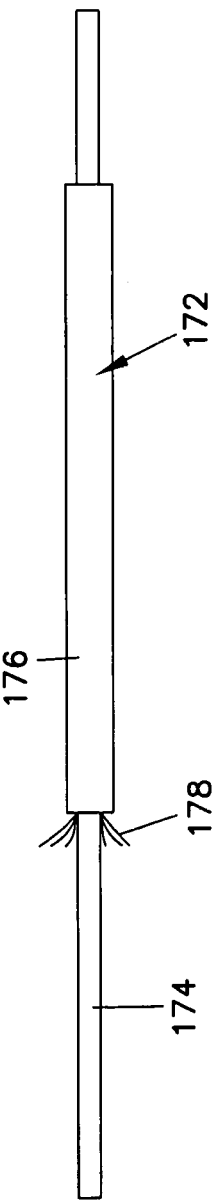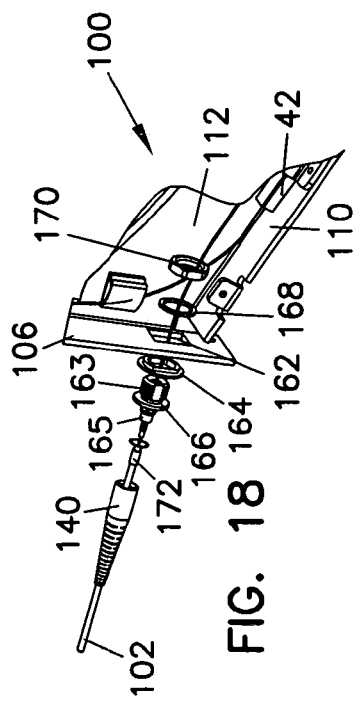

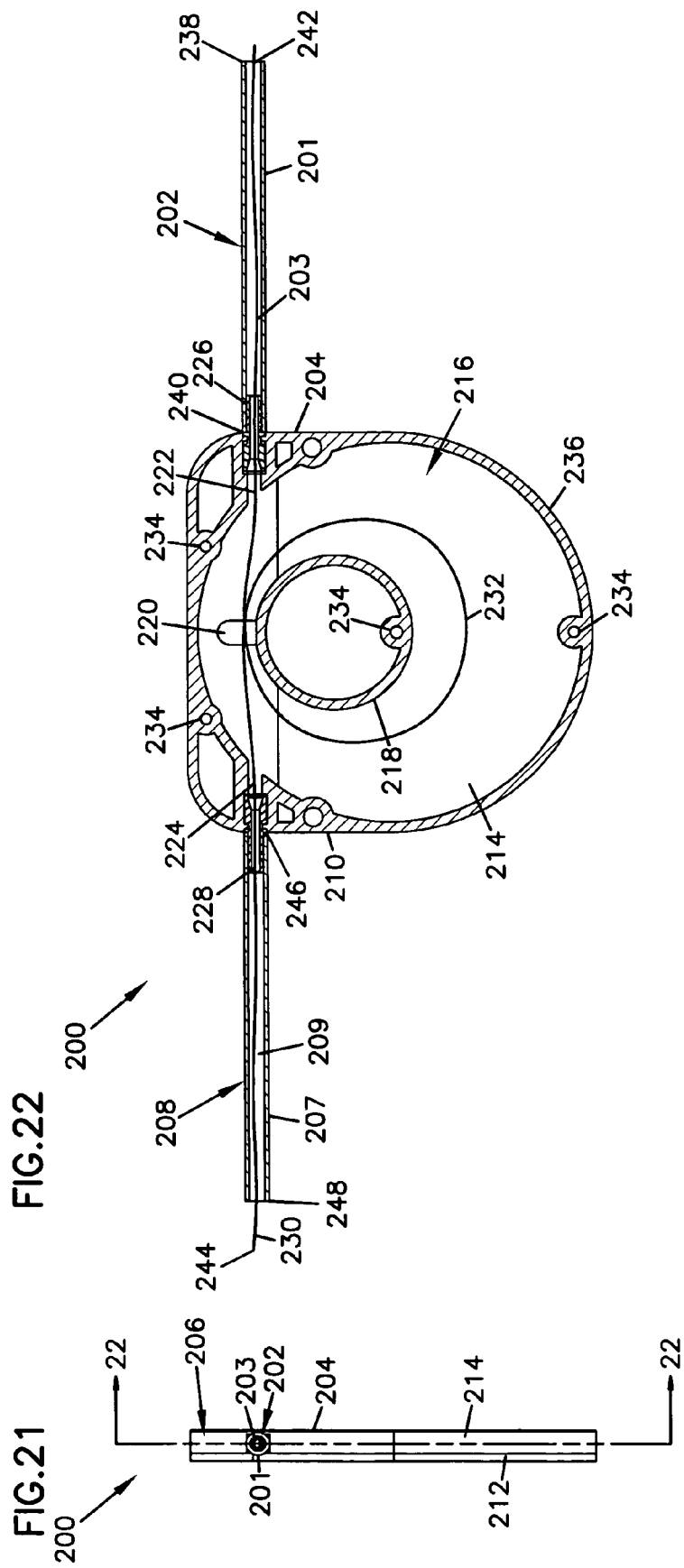

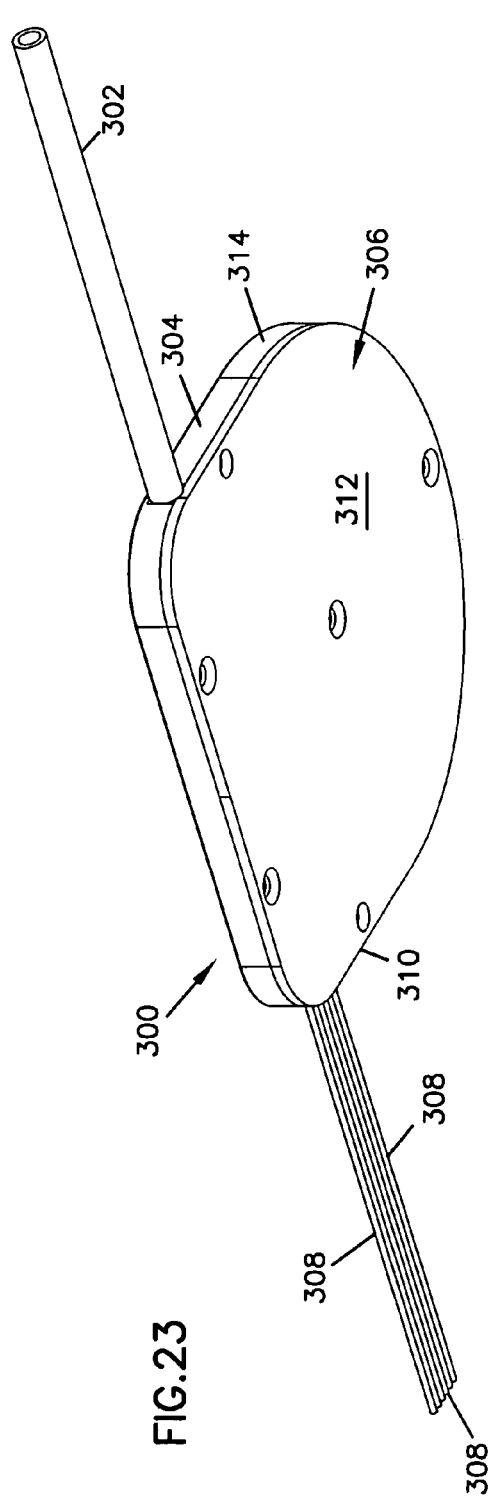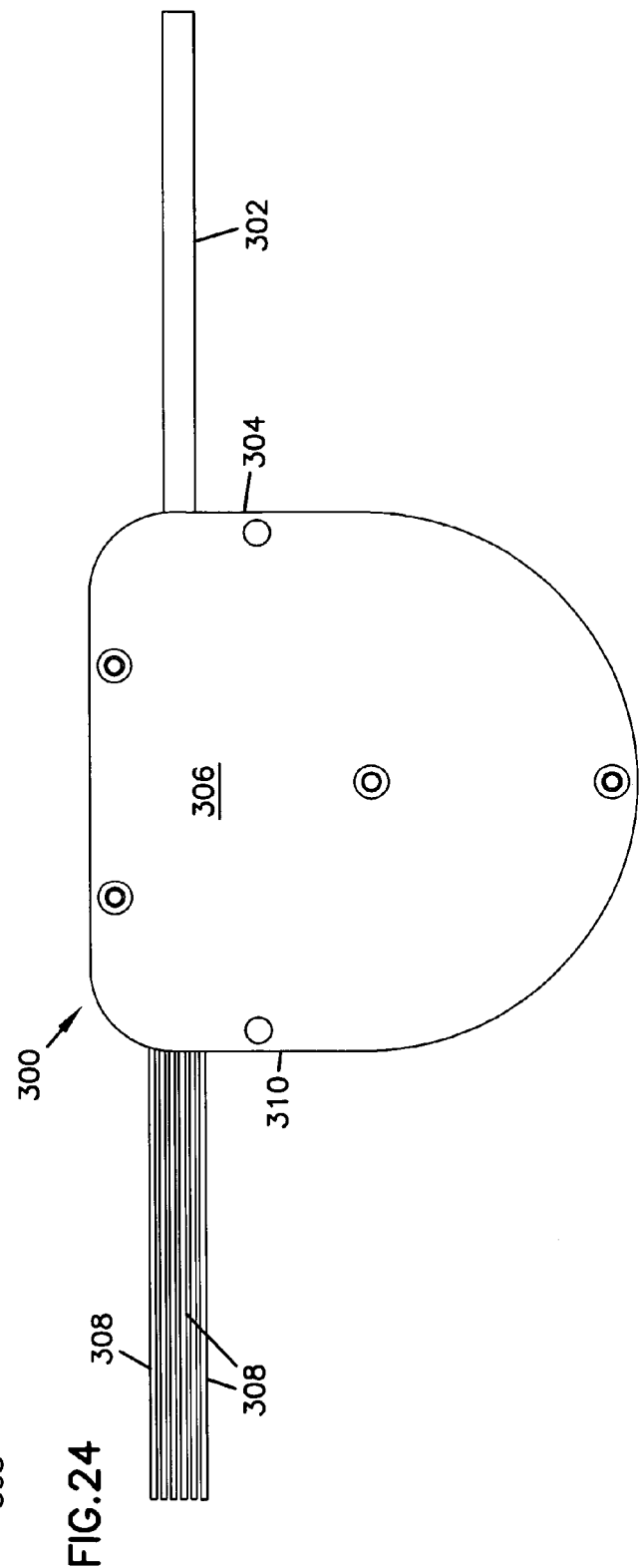

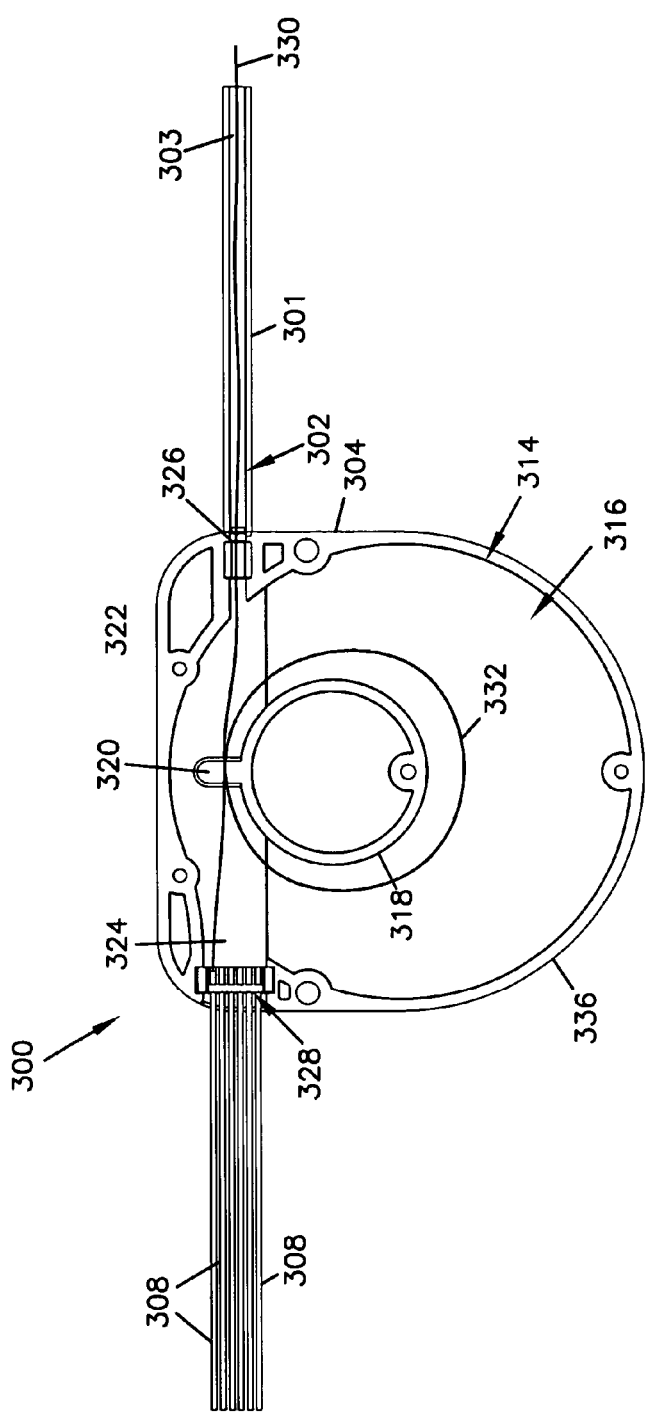
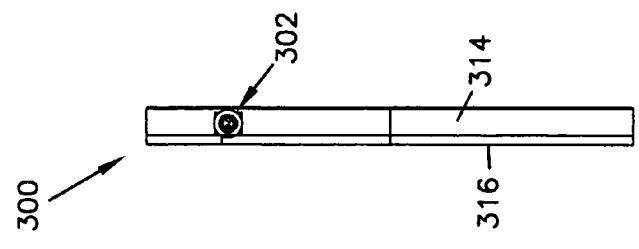
FIG.26
FIG.25

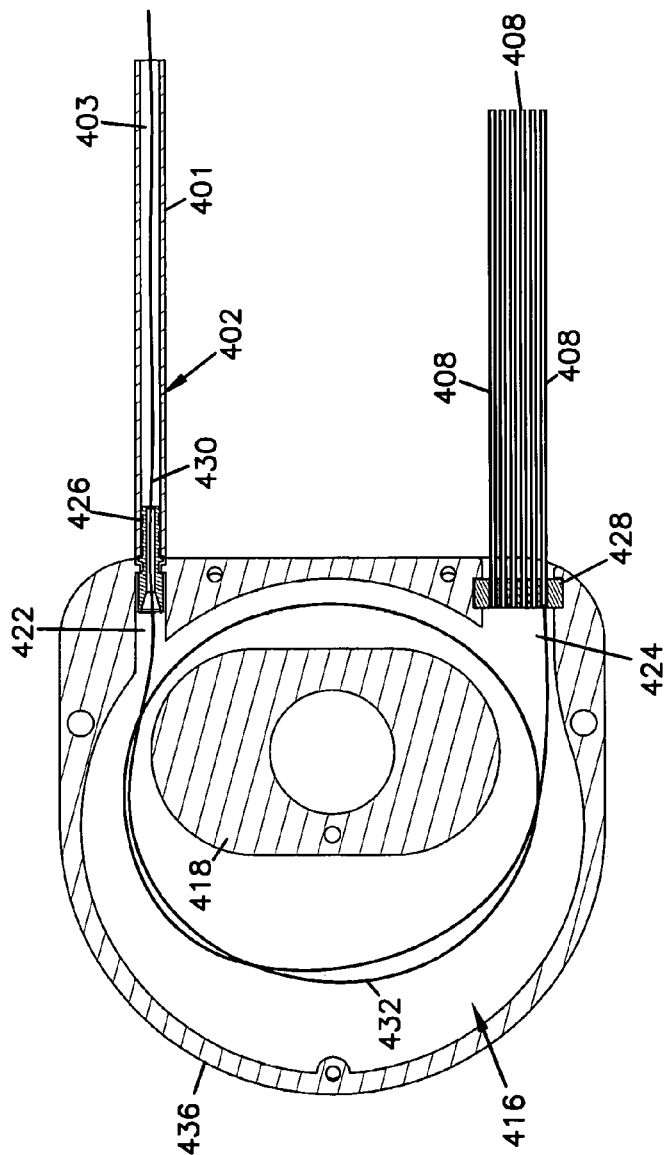
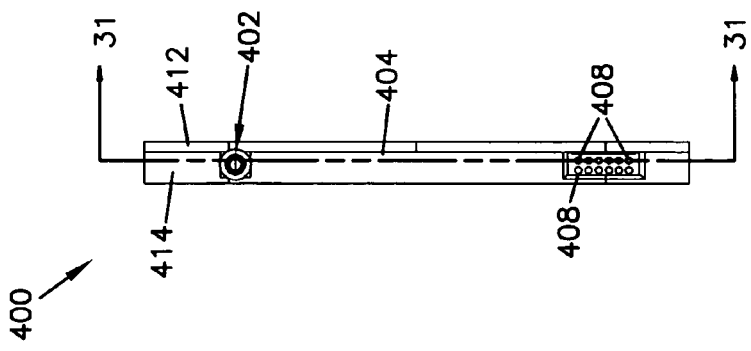
FIG. 31
FIG. 30

FIBER OPTIC FURCATION DEVICE INCLUDING EXPANSION CHAMBER

FIELD

The present invention generally relates to optical fiber cable construction and furcation module construction.

BACKGROUND

Optical fiber cables are typically composed of a variety of linear elements which are terminated and constrained linearly with respect to each other. These elements may include the optical fiber itself, tubular sheathing materials, linear strength members, and outer layers for sealing the other elements from environmental damage from rain or other moisture. Each of these elements may have different thermal coefficients of expansion. At temperatures near the ambient temperature present when the cable is assembled and terminated, the differences in thermal expansion of the various elements is not significant enough to cause any attenuation or insertion loss to optical signals being transmitted by the cable.

However, as these cables are exposed to temperatures more extreme with respect to the ambient temperature at the time of assembly and termination, the differing thermal expansion coefficients may become more significant. Optical fiber cables may be exposed to operating temperatures up to one hundred degrees Fahrenheit removed from the ambient temperature of assembly and termination. At these temperatures, the differing degrees of elongation or contraction among the elements of the cable may damage the fiber or may cause unacceptable amounts of attenuation or insertion loss of signals being transmitted over the cable. Improvements to known optical fiber cables to address temperature-induced stresses are desirable.

SUMMARY

The present invention relates to an optical fiber device with an optical fiber extending from a first outer jacket through a fiber receiving device from a first outer jacket to a second outer jacket. The first outer jacket is anchored to a side of a housing of the fiber receiving device and the second outer jacket is anchored to a side of the fiber receiving device. The housing defines an interior which received the optical fiber and provides space for accumulating excess length of optical fiber generated by differential thermal contraction of the jackets and the optical fiber.

BRIEF DESCRIPTION OF THE DRAWINGS

The accompanying drawings, which are incorporated in and constitute a part of the specification, illustrate several aspects of the present invention and together with the description, serve to explain the principles of the invention. A brief description of the drawings is as follows:

FIG. 9 is a front perspective view of a prior art optical fiber module in accordance with the present invention.

FIG. 10 is a top view of the prior art optical fiber module of FIG. 9.

FIG. 11 is a front view of the prior art optical fiber module of FIG. 9.

FIG. 13 is a top view of a generalized layout of the optical fibers within the prior art optical module of FIG. 9.

FIG. 17 is a side view of an optical fiber up-jacket assembly for sheathing the single input fiber to the splitter.

FIG. 18 is a rear exploded perspective view of the single input fiber extending through the front of the prior art optical module of FIG. 9.

FIG. 21 is an end view of the fiber optic device of FIG. 19.

FIG. 22 is a cross-sectional view of the fiber optic device of FIG. 19, taken along line 22-22 in FIG. 21.

FIG. 23 is a perspective view of a first alternative fiber optic device including an expansion chamber according to the present invention.

FIG. 24 is a top view of the fiber optic device of FIG. 23.

FIG. 25 is an end view of the fiber optic device of FIG. 23.

FIG. 26 is a view of an interior of the fiber optic device of FIG. 23, with the cover removed.

FIG. 30 is an end view of the fiber optic device of FIG. 28.

FIG. 31 is a cross-sectional view of the fiber optic device of FIG. 28, taken along line 31-31 in FIG. 30.

DETAILED DESCRIPTION

Reference will now be made in detail to the exemplary aspects of the present invention that are illustrated in the accompanying drawings. Wherever possible, the same reference numbers will be used throughout the drawings to refer to the same or like parts.

Figure 1:
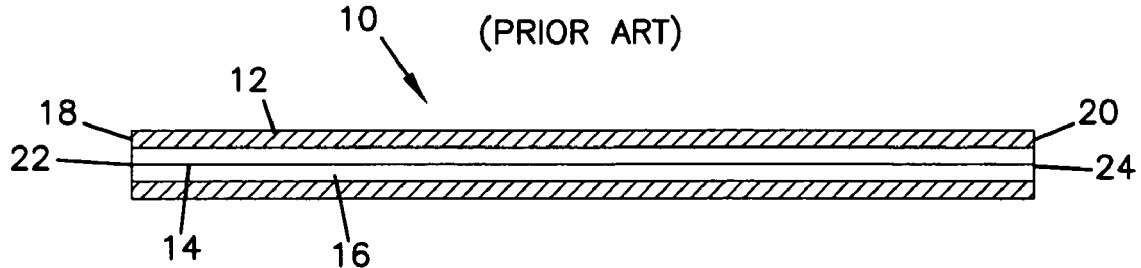
FIG. 1 is a cross-sectional view of a prior art optical fiber cable segment.
Figure 2:
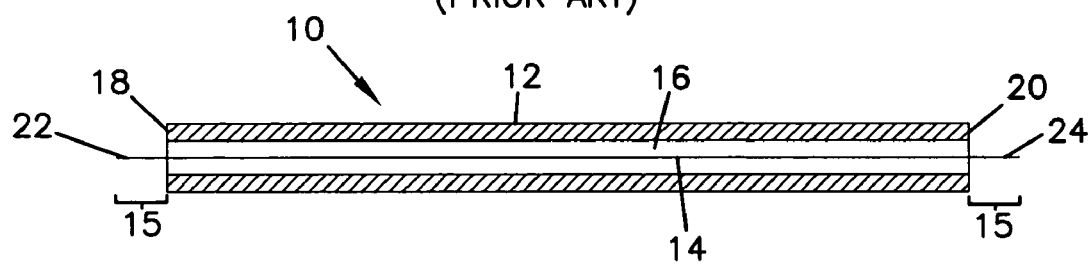
FIG. 2 is a cross-sectional view of the prior art optical fiber cable segment of FIG. 1 at a reduced ambient temperature where the ends of the fiber and the cable jacket are not constrained with respect to each other.
Figure 3:
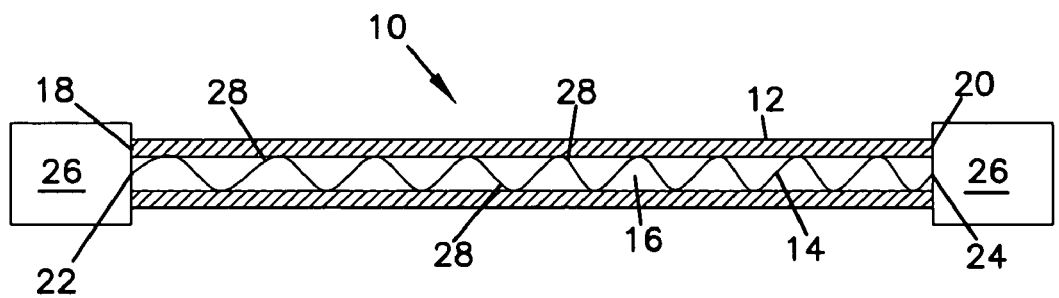
FIG. 3 is a cross-sectional view of the prior art optical fiber cable segment of FIG. 1 at a reduced temperature where the ends of the fiber and the cable jacket are constrained with respect to each other.

Optical fiber cables may be installed within telecommunications networks and exposed to the extremes of outside air temperatures. These optical fiber cables are made of a variety of materials, including but not limited to the optical fiber itself, jacketing and cladding, and strength members. Each of these constituent materials may have a different thermal coefficient of expansion, meaning that the materials will expand or contract at different rates due to temperature changes. The prior art optical fiber cables in FIGS. 1 to 3 show the effect of reduced temperature on an optical fiber cable 10 including an outer jacket 12 and an optical fiber 14. Fiber 14 is slidably held within a hollow opening 16 defined by jacket 12. Jacket 12 includes a first end 18 and an opposing second end 20 and fiber 14 includes corresponding first and second ends 22 and 24.

In FIG. 1, cable 10 is exposed to a first temperature such that the ends of fiber 14 and jacket 12 are aligned with each other. If fiber 14 and jacket 12 were originally the same length at the time of their assembly, this indicates that the first temperature is approximately equal to the ambient temperature at which cable 10 was assembled. Cable 10 may be an optical fiber drop cable where fiber 14 is freely slidable within opening 16 of jacket 14. The first ends 18 and 22 and the second ends 20 and 24 are not fixed or constrained with respect to each in cable 10.

In FIG. 2, cable 10 has now been exposed to a second temperature below the first temperature. Fiber 14 has a thermal coefficient of expansion which is relatively smaller than a thermal coefficient of expansion of jacket 12. At the second temperature, jacket 12 has contracted much more than fiber 14. Ends 22 and 24 of fiber 14 extend beyond ends 18 and 20, respectively, of jacket 12. Ends 22 and 24 of fiber 14 are unconstrained at ends 18 and 20, respectively, and are free to move beyond ends 18 and 20, as shown. Ends 22 and 24 extend beyond ends 18 and 20 to define an excess length 15 of fiber 14.

Alternatively, one of the first or second ends of fiber 14 and jacket 12 might be constrained with respect to each other provided the opposite ends are unconstrained and fiber 14 is freely movable within opening 16 of jacket 12.

In FIG. 3, cable 10 is now terminated at each of the first and second ends with an optical fiber connector 26. Such optical fiber connectors are well known in the art. To terminate cable 10 at connector 26, jacket 12 and fiber 14 are constrained with respect to each other. While optical fiber connector 26 may provide some degree of movement in compression of fiber 14, connector 26 does not permit fiber 14 to extend beyond connector 26. As shown in FIG. 3, cable 10 is exposed to the second, lower temperature and jacket 12 has contracted to the same extent shown in FIG. 2. In FIG. 3, however, ends 22 and 24 of fiber 14 are now constrained at ends 18 and 20 of jacket 12 by connectors 26. Thus, the contraction of jacket 12 compresses fiber 14 into the same length as jacket 12. Known materials suitable for making optical fiber 12 are essentially incompressible. Excess length 15 of fiber 14 is forced to fit within a shorter length of jacket 12 and is forced into a series of microbends 28 within opening 16. These microbends 28 may cause excess signal loss within cable 10. While cable 10 is shown as a single fiber cable and connectors 26 are described as fiber connectors, it is anticipated that a cable including multiple optical fibers could be substituted for cable 10 and a cable breakout at the end of such a multifiber cable could be substituted for connector 26 within the present invention.

Figure 4:
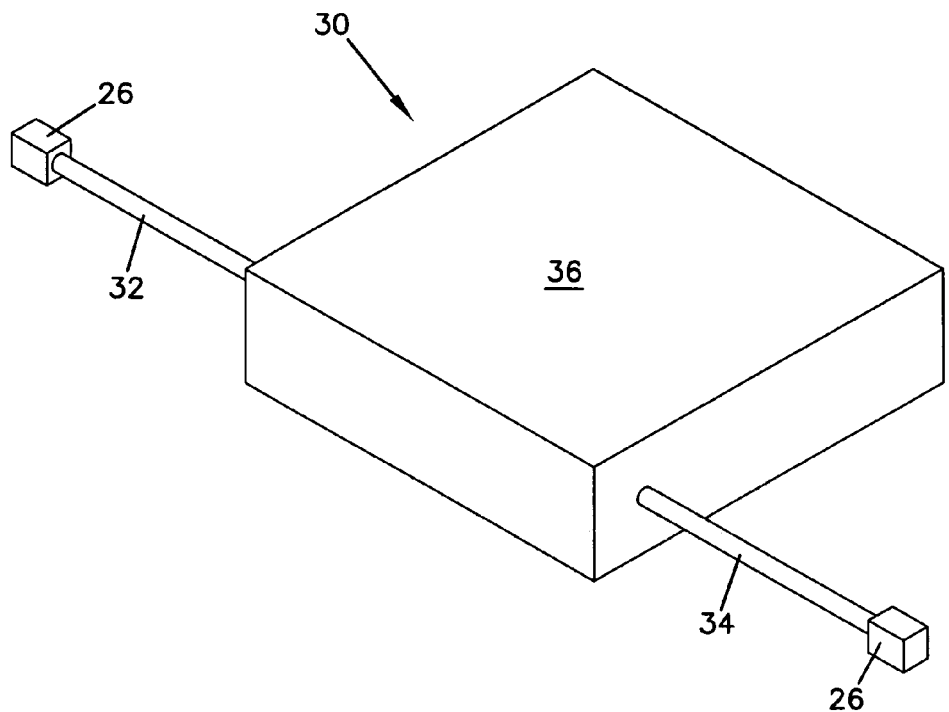
FIG. 4 is a perspective view of an optical fiber cable including a loop housing in accordance with the present invention.
Figure 5:
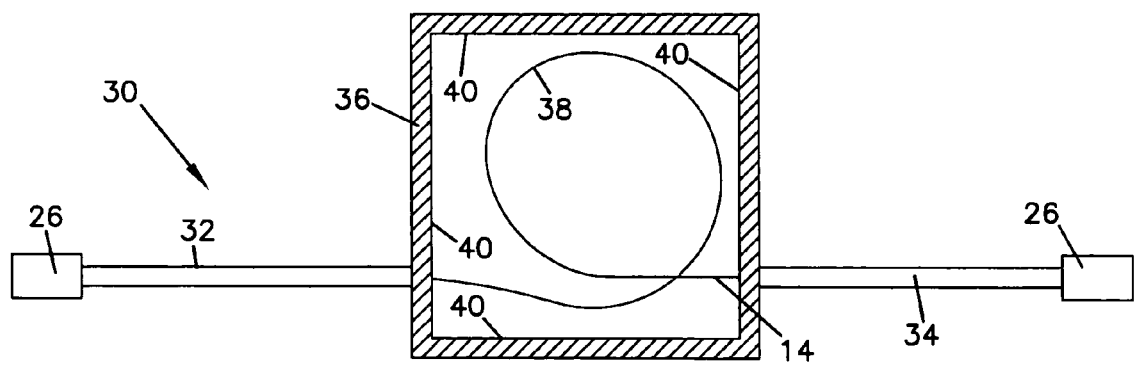
FIG. 5 is a top view of the optical fiber cable of FIG. 4 with the top removed from the loop housing.

Referring now to FIGS. 4 and 5, a cable 30 in accordance with the present invention includes a first jacket segment 32, a second jacket segment 34, fiber 14 and connectors 26 at each end. As discussed above, both fiber 14 and jackets segments 32 and 34 are constrained with respect to each other at connectors 26. Mounted between jacket segments 32 and 34 is a fiber receiving device 36. As shown, the fiber receiving device is a fiber loop box 36. Fiber 14 extends from a first connector 26 through jacket segment 32 into box 36, forms a loop 38 and then extends through jacket segment 34 to a second connector 26.

When cable 30 is exposed to a range of temperatures and jacket segments 32 and 34 extend and contract in response, any excess length of fiber 14 is gathered within box 36. Loop 38 of fiber 14 is sized to fit within box 36 offset from the inner surfaces 40. This will allow loop 38 to grow in size without being limited by inner surfaces 40 as excess length 15 is incorporated within loop 38. Box 36 should be sized to permit the formation of a loop that is greater in diameter than the minimum bend radius of fiber 14.

Figure 5A:
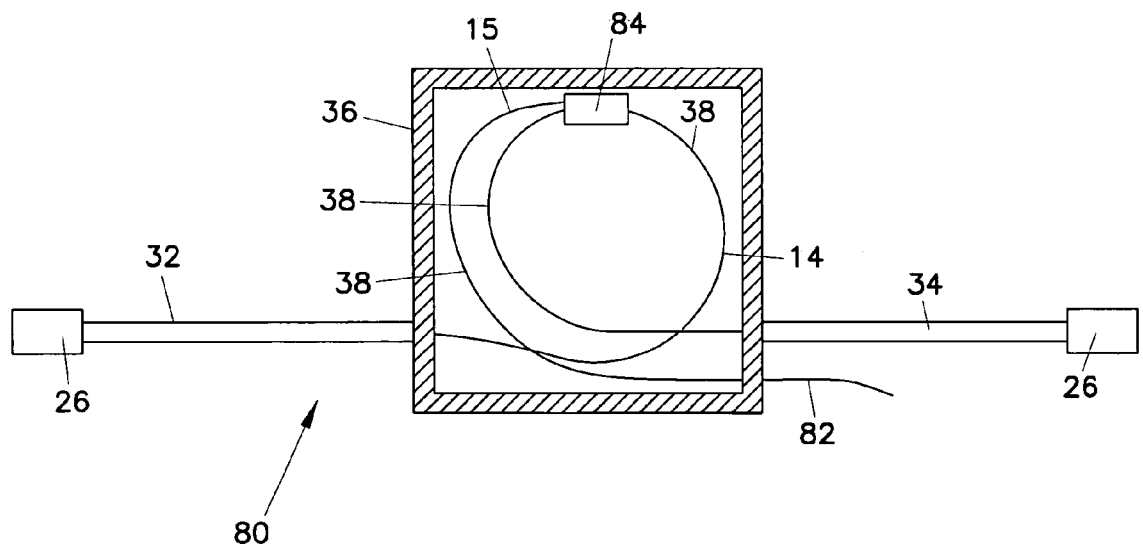
FIG. 5A is a top view of a first alternative embodiment of an optical fiber cable in accordance with the present invention including a coupler within a loop housing with the top removed from the housing.

FIG. 5A shows an optical fiber cable 80 similar to cable 30, with the addition of an optical device 84 such as a coupler mounted within box 36. Fiber 14 extends through first cable segment 32 from connector 26 into box 36 forming a loop 38 to receive excess fiber length and is constrained at optical device 84. Within device 84, a portion of the signal transmitted by fiber 14 is tapped or split into a second fiber such as a fiber 82. An extension 15 of fiber 14 is constrained at device 84 and extends out of box 35 through second jacket segment 34 to connector 26. Fiber 82 extends from device 84 out of box 36. Both fibers 15 and 82 form loops 38 within box 36 to receive excess fiber length within box 36.

Figure 6:
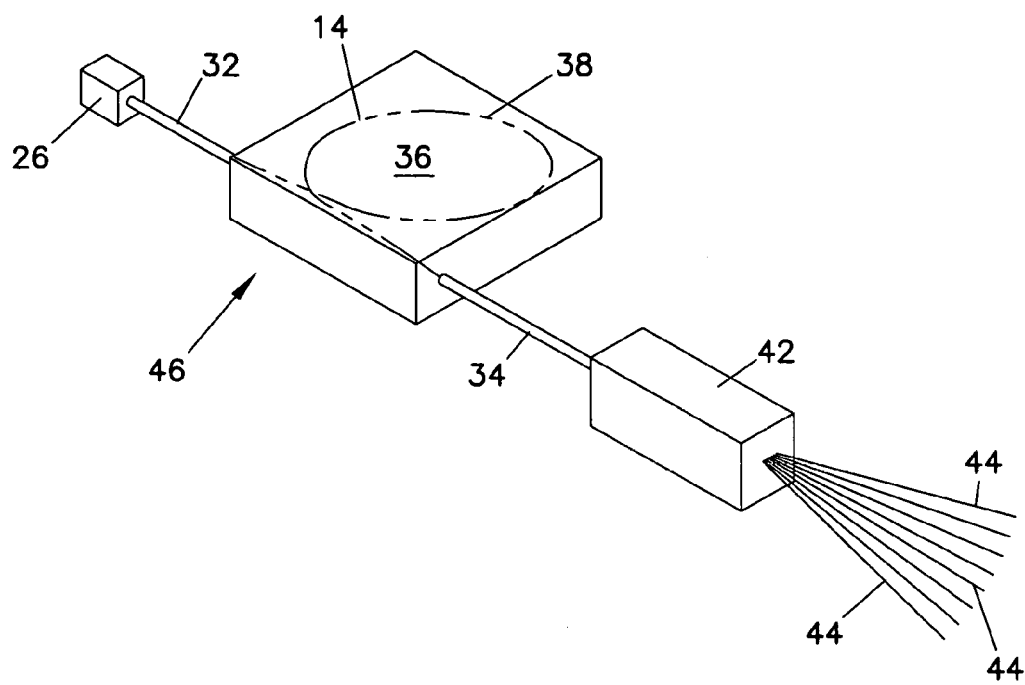
FIG. 6 is a perspective view of an optical fiber cable and splitter in accordance with the present invention.
Figure 12:
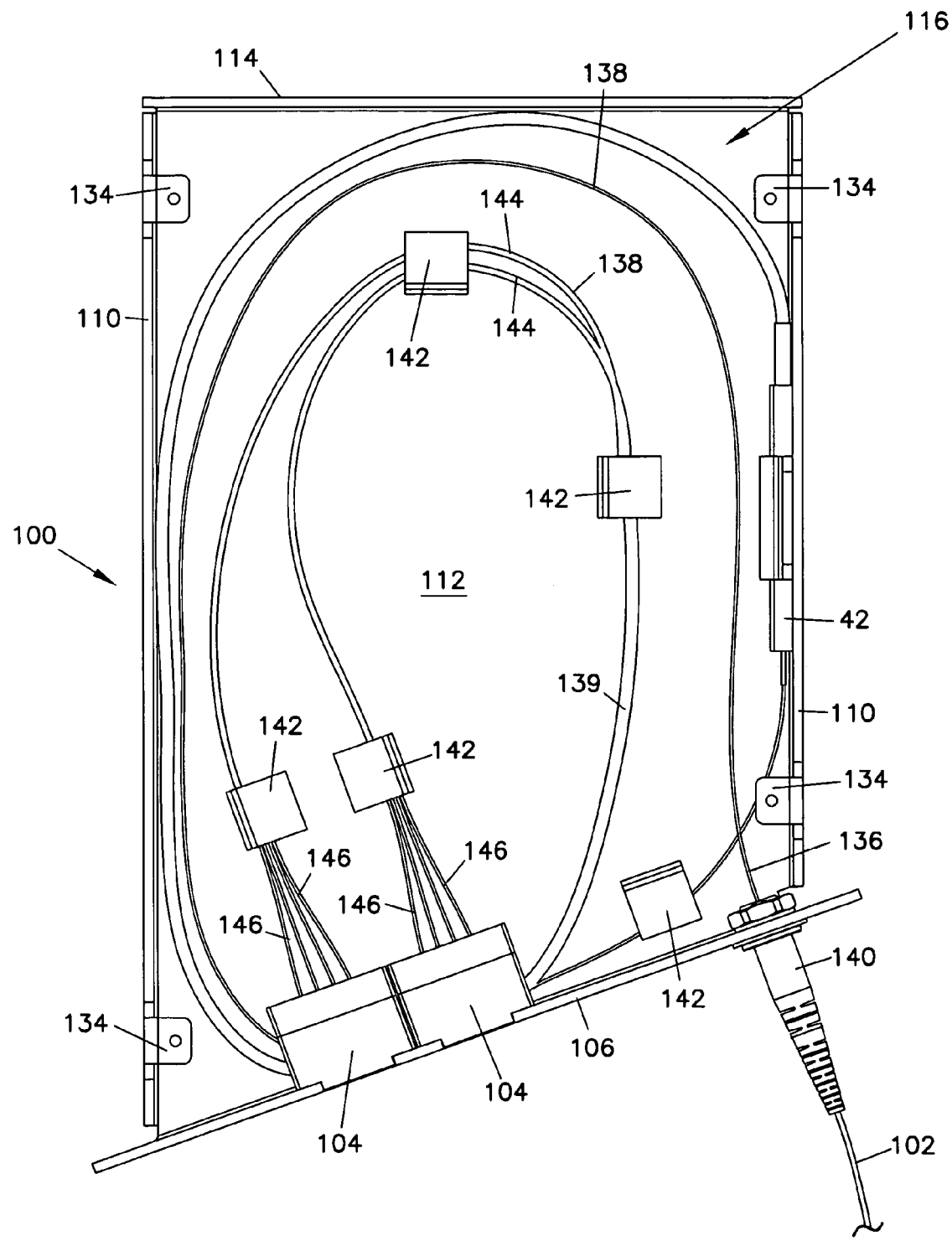
FIG. 12 is a top view of the prior art optical fiber module of FIG. 9, with the top of the module removed to permit visibility of the interior of the module.

FIG. 6 shows an alternative embodiment of an optical fiber cable 46 in accordance with the present invention. Cable 46 includes fiber segments 32 and 34 and fiber loop box 36. Optical fiber 14 (shown within box 36 in hidden lines) within cable 46 is a single strand of fiber carrying a plurality of optical signals simultaneously. Segment 32 and fiber 14 within segment 32 are constrained at one end at connector 26. At a second end of segment 34 of cable 46, a splitter 42 is included. Fiber 14 and jacket segment 34 are constrained with respect to each other at one end of splitter 42. Within box 36, fiber 14 forms a loop 38 to receive any excess fiber that might be formed when jacket segments 32 and/or 34 contract more than fiber 14. At an opposite end of splitter 42 are a plurality of optical fibers 44. Each of these fibers 44 may carry one of the plurality of optical signals from fiber 33 which has been separated from the other optical signals by splitter 42. As shown, eight optical fibers 44 extend from splitter 42. Alternatively, individual fibers 44 could be combined into a single ribbon fiber extending from splitter 42 and the individual fibers 44 broken out from the ribbon cable at a point removed from splitter 42. (Such an arrangement is shown in FIG. 12, below.)

Figure 7:
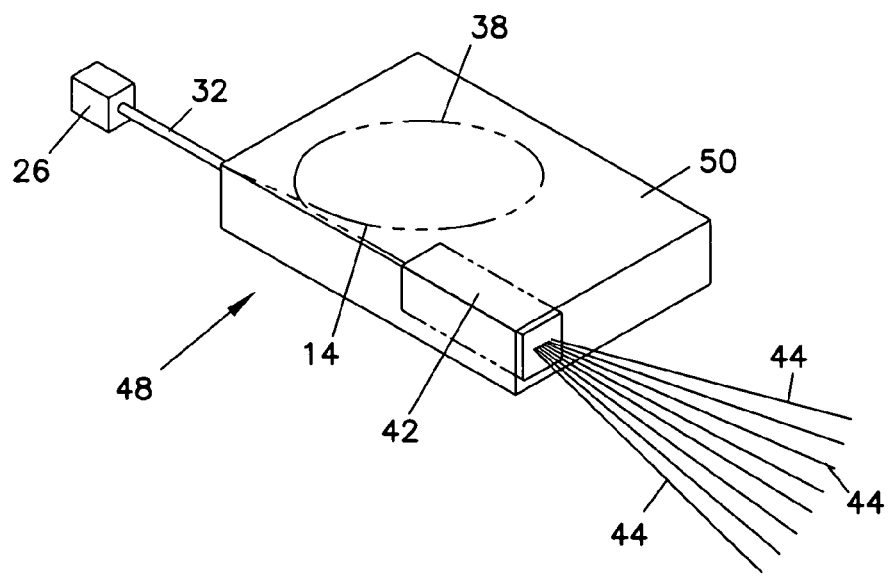
FIG. 7 is a perspective view of a second alternative embodiment of an optical fiber cable including a loop housing and splitter mounted within the loop housing in accordance with the present invention, with the fiber and splitter within the housing shown in hidden lines.

FIG. 7 shows a further alternative embodiment of an optical fiber cable 48 including first jacket segment 32 with connector 26 at one end. Segment 32 and fiber 14 within segment 32 are constrained at connector 26. Within a fiber loop box 50 a splitter 42 is mounted so that fibers 44 extend from box 50. Fiber 14 is constrained within box 50 at splitter 42. First jacket segment is constrained at box 50 opposite from connector 26. Cable 48 does not include a second jacket segment 34 within which fiber 33 extends. A loop 38 of optical fiber within box 50 between jacket segment 32 and splitter 42 permits any excess cable length 15 due to contraction of jacket segment 32 to be absorbed without creating microbends which might create undesirable signal loss. As above, fibers 44 could be combined into a single ribbon cable and broken out into individual fibers at a point removed from box 50.

Figure 8:
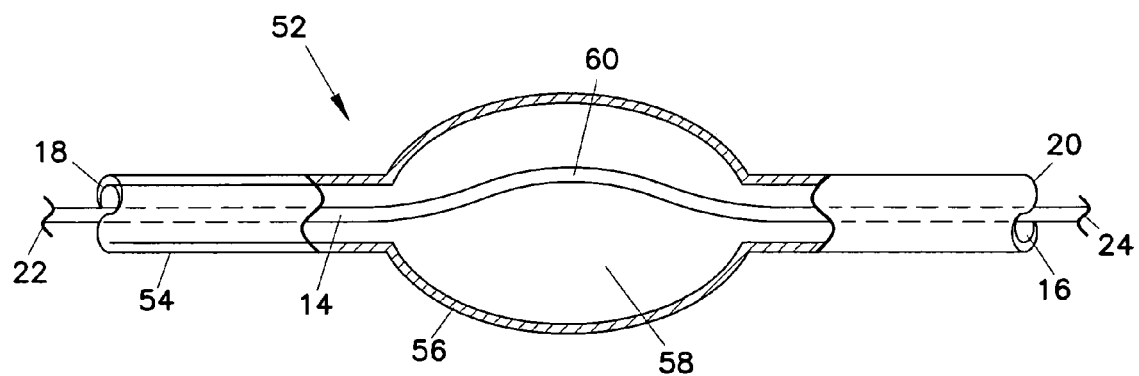
FIG. 8 is a side view with partial cross-section of a third alternative embodiment of an optical fiber cable with in accordance with the present invention including an intermediate portion of tubing to receive excess fiber length.

FIG. 8 illustrates a still further alternative embodiment of an optical fiber cable 52 including a wider portion 56 of a cable jacket 54. Within portion 56 is defined an enlarged segment 58 of opening 16 through which fiber 14 extends. As described above, ends 18 and 20 of jacket 54 and ends 22 and 24 of fiber 14 are constrained with respect to each other, respectively. As jacket 54 contracts linearly when exposed to low ambient temperatures, excess fiber length 15 is collected within a curve 60 within enlarged segment 58. Segment 58 is sized to allow accumulation of the anticipated amount of excess fiber length 15 based on the overall length of cable 52 and the percentage of shrinkage calculated at the lowest ambient temperature for which cable 53 is likely to be subjected. This accumulation of excess fiber length 15 with curve 60 will avoid the problem of forcing microbending within opening 16 as shown above in FIG. 3. Alternatively, wide portion 56 and segment 58 could be created in one or more standard sizes and the appropriate size incorporated into cable 52 depending of the length of cable 52 and a standardized lowest expected ambient temperature.

Referring now to FIGS. 9 to 11, a telecommunications module 100 is shown with an input optical fiber cable 102 and a plurality of output optical fiber holders 104 mounted to a front 106. Module 100 includes a housing with a top 108, a pair of opposing sides 110, a bottom 112 (shown in FIG. 12, below), and a back 114. The housing defines an interior 116 (also shown in FIG. 12, below). As shown, module 100 is an optical fiber splitter module, capable of separating an incoming optical fiber signal from cable 102 into up to thirty-two output optical fiber signals, each signal transmitted through an output optical fiber cable 118 terminated at an optical fiber connector 119. One cable 118 is shown in FIG. 10. Each of the optical fiber holders 104 is adapted to hold up to eight output cables 118.

On each of the sides 110 is a mounting rail 120, adapted for mounting module 100 to a telecommunications equipment rack or similar structure. Adjacent sides 110, face 106 includes a pair of flanges 122 with one or more fastener openings 124. Flanges 122 and openings 124 aid with the mounting and secure fastening of module 100 to such a rack or structure. Each of the holders 104 includes eight openings 126, each opening 126 adapted to receive one of the output fibers 118. On front 106 is a space 128 for receiving indicia identifying module 100 or the cables extending to or from module 100. On top 108 is a space for receiving a label 130. As shown, front 106 is angled with respect to back 114 to aid access to front 106 or cables 102 and 118 and to improve the cable management of these cables extending to and from module 100.

FIG. 12 shows module 100 with top 108 removed to show routing of optical fibers within interior 116. Flanges 134 are included along sides 110 for receiving fasteners holding top 108 to module 100. Mounted within interior 116 along one of the sides 110 is splitter 42. An optical fiber 136 from cable 102 extends into interior 116 through front 106. Fiber 136 is formed into a loop 138 within interior 116 before being directed to a first end of splitter 42. An outer jacket of cable 102 is terminated at and constrained to a boot 140 attached to front 106. Fiber 136 extends through loop 138 to splitter 42 about interior 116 to ensure that minimum bend radius requirements to avoid excessive signal loss are maintained. One or more cable clips 142 are mounted to bottom 112 to aid in the layout of cable 136 within interior 116.

Any contraction of the jacket of cable 102 might result in the formation of excess length 15 of fiber 136. Loop 138 provides a place to accumulate any such excess length 15 and avoid the creation of undesirably tight bends of fiber 136 within module 100 or cable 102.

A plurality of ribbon cables 144 extend from splitter 42 opposite fiber 136. Splitter 42 separates the optical signals carried by fiber 136 into up to thirty-two individual optical signals. Each ribbon cable 144 may include up to eight fibers 146, each fiber carrying one of those optical signals. Ribbon cables 144 extend from splitter 42 to mounting holders 104 in front 106. Ribbon cables 144 form a loop 148 within interior 116 between splitter 42 and holders 104. Cable clips 142 are provided to aid in the routing and organization of loop 148 of cables 144 and cables 146 within interior 116. Loop 148 is shown in ribbon cables 144 with fibers 146 being broken out from ribbon cables 144 shortly before fibers 146 enter openings 126 of holders 104. Alternatively, individual fibers 146 could extend from splitter 42 about loop 148 with no ribbon cables included within interior 116.

Fibers 146 are freely slidable within jackets of cables 118 and both the jacket and fibers 146 are terminated and constrained at connector 119. Cables 118 are also constrained at holders 104, as will be described further below. Fibers 146 extend through holder 104 to ribbon cables 144 and ribbon cables 144 are constrained at splitter 42. In one alternative where fibers 146 extend from holders 104 to splitter 42, fibers 146 are constrained at splitter 42. Any excess length 15 of fiber 146 within cable 118 created due to contraction of the jacket of cable 118 is accumulated within interior 116 by loop 148.

FIG. 13 shows a generalized top view of the elements within interior 116. Only one of the ribbon cables 144 is shown completely and it should be understood that the other ribbon cables 144 are similarly constructed. At an end 145 of ribbon cable 144 individual fibers 146 are broken out. Only three fibers 146 are shown for clarity. Fibers 146 extend through an opening 126 of one of the holders 104 within a furcation tube assembly 148.

Figure 14:
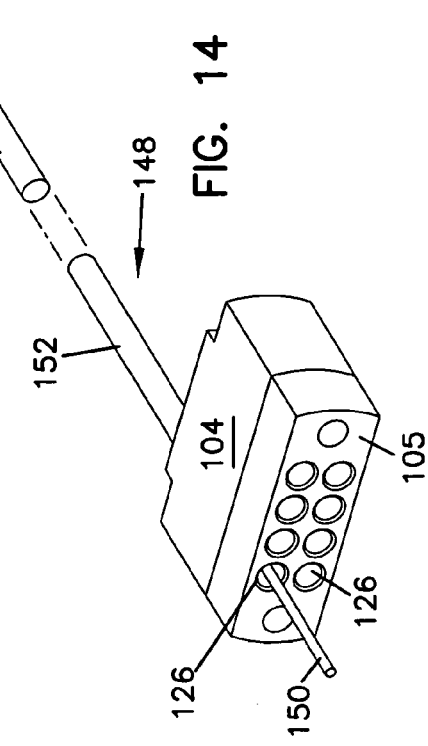
FIG. 14 is a rear perspective view one of the optical fiber up-jacket mounting blocks from the front of the prior art optical module of FIG. 9, with a single up-jacket tubing assembly mounted within one of the mounting openings for sheathing one of the plurality of fibers extending from splitter.
Figure 19:
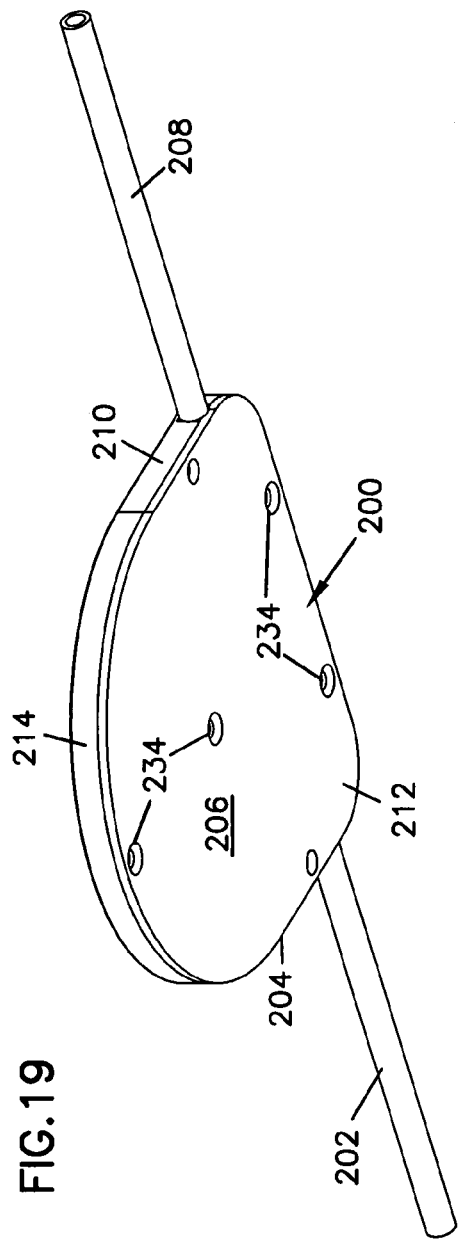
FIG. 19 is a perspective view of a fiber optic device in accordance with the present invention.
Figure 20:
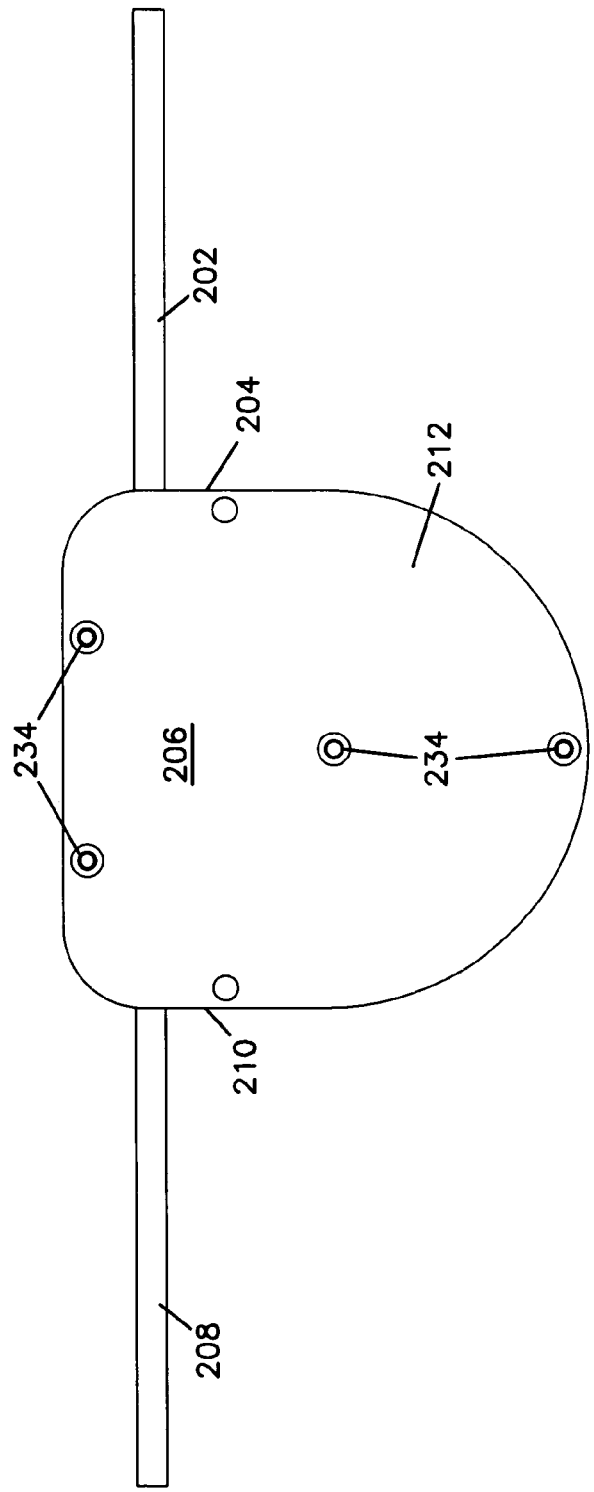
FIG. 20 is a top view of the fiber optic device of FIG. 19.

FIG. 14 shows an inner face 105 of holder 104 with one furcation tube assembly 148 within one of the openings 126. Furcation tube assembly 148 includes a hollow inner tube 150 and a hollow outer tube 152. Outer tube 152 includes an opening within which inner tube 150 in inserted. Other elements may also be included within the opening of outer tube 152 about inner tube 150. These elements may include but are not limited to strength members or similar elements. Inner tube 150 includes an opening through which fiber 146 may be slidably inserted.

Figure 16:
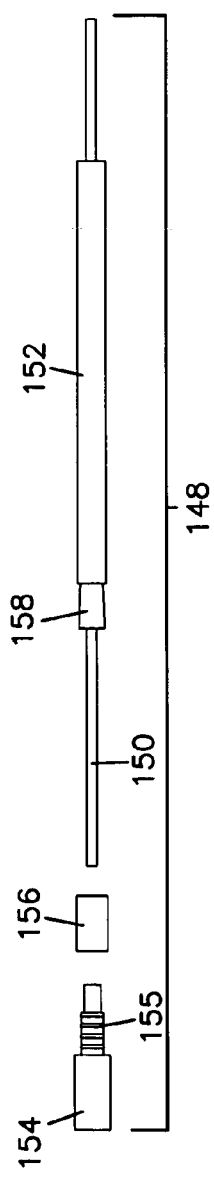
FIG. 16 is an exploded view of the optical fiber up-jacket tubing assembly of FIG. 15.
Figure 15:
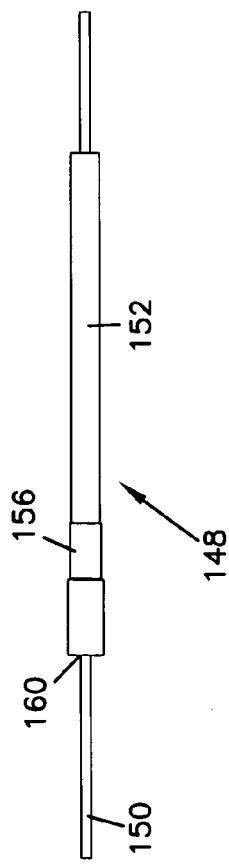
FIG. 15 is a side view of the optical fiber up-jacket tubing assembly from FIG. 13.

FIGS. 15 and 16 show furcating tube assembly 148 in additional detail, including a mounting collar 154 with a front portion 153 sized to be inserted within one of the openings 126 of holder 104. Front portion 153 may be slightly oversized within respect to opening 126 to promote a friction fit within opening 126. Alternatively, an adhesive or some mechanical means may be used to secure mounting collar 154 within opening 126. Mounting collar 154 includes a central hollow opening through which inner tube 150 extends. A rear portion 155 of mounting collar 154 is sized to extend within the opening of outer tube 152 about inner tuber 150. A strength member 158 is shown in FIG. 16 extending from between inner tube 150 and outer tube 152. Strength member 158 as shown is an aramid fiber such as Kevlar but other suitable materials may also be used. When rear portion 155 is positioned between inner tube 150 and outer tube 152, strength member 158 is overlapped onto rear portion 155. A crimp sleeve 156 is fit about outer tube 152 above rear portion 155 of mounting collar 154 and crimped to hold these elements together. An adhesive may also be applied at location 160 where inner tube 150 extends through mounting collar 154 to ensure that inner tube 150 remains fixed within assembly 148.

FIGS. 17 and 18 show additional details of input fiber 102 and boot 140 and their assembly to module 100. An opening 162 in front 105 receives an insert 164 and a threaded portion 163 of a cable mount 166 from outside module 100. Within interior 116 a washer 168 and a nut 170 are placed over threaded portion 163 of mount 166 and secure mount 166 to front 106. In FIG. 17, an outer jacket assembly 177 for input cable 102 includes a hollow inner tube 174 with an opening to receive optical fiber 136. A hollow outer tube 176 is positioned about inner tube 174 and a strength member 178 is positioned between the inner and outer tubes.

Inner tube 174 is inserted through cable mount 166 so that strength member 178 is positioned about as crimp portion of cable mount 166. A crimp sleeve 172 is positioned outer tube 176 and strength member 178 and crimped about crimp portion 165 to hold these elements together. Boot 140 is positioned about crimp sleeve 172 to provide strain relief and protection to cable 102 and its connection to module 100.

FIGS. 19 to 22 illustrate a fiber optic device 200 with a first optical fiber cable 202 on a first side 204 of a housing 206 and a second optical fiber cable 208 on a second side 210 of housing 206. As shown, first side 204 and second 210 are opposite sides of housing 206. Referring now to FIG. 22, housing 206 defines a fiber receiving device which may include a cover 212 fitting to an open body portion 214 and defining an interior 216. First cable 202 may include an outer sheath or jacket 201 and an inner opening 203 for receiving at least one optical fiber. Outer jacket 201 may be terminated with respect to side 204 at an extension or fitting 226 so that opening 203 is in communication with an opening 222 of housing 206 to permit an optical fiber 230 within opening 203 to pass into interior 216. Second cable 208 may be similarly configured with an outer jacket 207 defining an inner opening 209. Outer jacket 207 may be terminated to an extension or fitting 228 of side 210 so that optical fiber 230 may extend from interior space 216 into inner opening 209.

Fittings 226 and 228 may be similarly constructed and formed as separate pieces which may be positioned within openings 222 and 224, respectively. Having fittings 226 and 228 are separate items from housing 206 permits attachment of outer jackets 201 and 207 to the fittings and then have the combination of fittings 226 and 228, and cables 202 and 208 positioned within open body portion 214. This may aid in the accuracy and ease of assembly. Device 200 may be assembled into an intermediate point of a cable assembly which is then terminated, such as by a connector, at both ends, in a similar fashion as shown in FIG. 8, above. The connection of cables 202 and 208 to fittings 226 and 228, respectively, may be a primarily mechanical connection, such as may be shown with fittings 226 and 228, or may be aided or secured by an adhesive, such as may be shown in the embodiment below.

Within interior 216, fiber 230 may extend from opening 222 directly to opening 224 or it may extend within interior space 216 about a central support 218 creating a loop 232 of excess fiber length. If outer jacket 201 and/or outer jacket 207 are exposed to temperature extremes that may result in differential shrinking of the outer jackets with respect to fiber 230, loop 232 may accept any additional slack and prevent microbending, as discussed above with regard to FIG. 3. Conversely, if outer jackets 201 and/or 207 expand at a greater rate than fiber 230 when exposed to temperature extremes, loop 232 may provide sufficient excess length to offset any differential and prevent fiber 230 from being placed under excess tension.

Central structure 218 is shown as including a tab 220 which may assist with the placement and securing of fiber 230 and loop 232 within interior 216 during assembly of device 200 or during later repairs and reassembly. More tabs 220 may be included in central structure 218. As shown, cover 212 may be held to open body 214 by removably fasteners such as screws within openings 234, or cover 212 may be more permanently fixed to body 214. Central support 218 is preferably large enough in diameter to provide minimum bend radius protection to fiber 230 during any changes in temperature which may absorb some of fiber 230 in loop 232. An outer wall 236 defines an outer limit to a cable routing path within interior 216 with central support 218 defining an inner limit of the cable routing path. Openings 235 of housing 206 extend through the housing and allow fasteners (for example, screws or bolts, not shown) extending through openings 235 to mount or attach device 200 to another optical component, an equipment rack, or similar structure.

Device 200 may be assembled by beginning with first optical fiber cable 202 with optical fiber 230 extending within opening 203 of outer jacket 201. Optical fiber 230 includes a first end 242 and a second end 244. First outer jacket 201 includes a first end 238 and a second end 240. First ends 238 and 242 are constrained with respect to each other, such as at a termination or a connector. Second end 244 of optical fiber 230 is extended beyond second end 240 of first outer jacket 201. Second end 244 of fiber 230 is passed through opening 222 and fitting 226 and second end 240 of jacket 201 is connected to fitting 226. A first end 246 of second cable jacket 207 is connected to fitting 228. Fiber 230 is passed through interior 216 and extended through opening 224, fitting 228, and into inner opening 209 of second cable 208. Second end 244 of fiber 230 may also be constrained with respect to a second end 248 of cable jacket 207.

Referring now to FIGS. 23 to 27, a second embodiment of a fiber optic device 300 according to the present invention includes housing 306 with a first fiber optic cable 302 on a first side 304 and a plurality of second optical fiber cables 308 on a second side 310. First cable 302 may include a plurality of optical fibers 330 within an inner opening 303 surrounded by an outer jacket 301. A loop 332 of these fibers 330 is shown extending into an interior 316 defined a cover 312 and an open sided body 314. Within interior 316, loops 332 of fibers 330 may extend about an interior support 318 and be held in place by one or more tabs 320. Second cables 308 may be upjackets, such as a 2 mm standard jacket, into which fibers 330 are inserted. Alternatively, other types and styles of breakout jacketing for fibers 330 may be used. Only one fiber 330 and one loop 332 is shown for illustration purposes, but it anticipated that a plurality of fibers 330 may be extend within first cable 302 and form a plurality of loops 332 within interior 316 about central support 318.

Outer jacket 301 of first cable 302 is anchored to first side 304 at a fitting 326 which terminates outer jacket 301 to housing 314. Outer jackets 307 of second cables 308 are terminated at second side 310 by a fitting 328. Fibers 330 extend from inner opening 303 of first cable 302 through an opening 322 into interior 316, and may extend about interior support 318 before being directed through an opening 324 and into one of the second cables 308. Only one fiber 330 is shown as an example and other fibers 330 have been removed for clarity of FIG. 26.

Fittings 326 and 328 may be formed as separate elements from housing 306 and may be separately attached to outer jackets 301 and 307 of cables 302 and 308, respectively. Fitting 326 may be similarly configured to fitting 226, shown in FIG. 22, above, for connection to outer jacket 307 of cable 302. The plurality of fibers 332 within cable 202 are then separated within housing 306 and directed each to one of the cables 308. Outer jackets 307 of cables 308 may be pre-connected or mounted to fitting 328 so that each of the fibers 330 may be inserted within one of the outer jackets 307 prior to assembly of fittings 326 and 328 within housing portion 314. The connection of cables 302 and 308 to fittings 326 and 328, respectively, may be a primarily mechanical connection, such as may be shown with fitting 326, or may be secured by an adhesive, such as may be shown with fitting 328.

Optical device 300 provides protection to fibers 330 in generally the same manner as optical device 200, allowing excess length of fiber 330 with respect to outer jackets 301 and 307 to be stored within interior 316. An outer wall 336 defines an outer limit to a cable routing path within interior 316 and central support 318 defines an inner limit of the cable routing path. Cable 302 and cables 308 permit fibers 330 to enter and exit from interior 316 and the cable routing path on opposite sides of housing 306.

A third alternative embodiment of a fiber optic device 400, shown in FIGS. 28 to 31, includes a first fiber optic cable 402 and a plurality of second fiber optic cables 408 which are both on a first side 404 of a housing 406. Housing 406 includes an open body portion 414 and a cover 412 defining an interior 416. A central support 418 is positioned within interior 416 and cooperates with an outer wall 436 to define a cable routing path for a loop 432 of a fiber 430 extending from first cable 402 to one of the second cables 408. A single fiber 430 forming a single loop 432 is shown to illustrate routing of fiber 430 within interior 418. It is anticipated that a cable 402 may include a plurality of fibers 430 and these fibers 430 may form a plurality of loops 432 within interior 416 about central support 418.

A fitting 426 is provided at a first opening 422 in side 404 to anchor an outer jacket 401 of cable 402 to housing 406 and permit fibers 430 to pass from an inner opening 403 of cable 402 into interior 416. A fitting 428 is provided at a second opening 424 in side 404 to anchor second cables 408 to housing 406 and permit fiber 430 to pass from interior 416 into cables 408. Configuring housing 406 with first and second openings 422 and 424 on the same side 404, as opposed to opposite sides 204 and 210 or opposite sides 304 and 310, different cable routing requirements within a particular optical fiber installation may be supported. It is anticipated that fittings 426 and 428 are similarly configured to fittings 326 and 328, respectively, as described above. It is also anticipated that a further alternative embodiment may include a single cable 408 and may direct a single fiber 430 from cable 402 to the single cable 408, similar to device 200, shown above. In this embodiment, fitting 426 may be similarly configured to fitting 226, described above.

As shown in devices 300 and 400, cables 302 or 402 may be a multiple fiber cable including, for example, twelve individual optical fibers 330 or 430. For this example, up to twelve cables 308 and 408 may be provided to protect these individual fibers 330 or 430 from thermal expansion or contraction effects and direct the fibers 330 or 430 to other devices or equipment. Other numbers of optical fibers 330 and 430 may be included within cables 302 and 402, and fittings 328 and 428 may be modified to alter the number of mounts for cables 308 and 408 extending from housings 306 and 406, respectively. Each of the devices 200, 300 and 400 include an open sided body portion and removable cover enclosing an interior. Such a configuration may installed on a fiber optic cable either in the field or as part of an original configuration assembled in a factory or workshop. This type of configuration also permits access to the interior for repair or replacement of fibers or components within the interior. Alternatively, the cover may be permanently affixed to the body portion once the device has been assembled, if it is intended that the device not be repairable, or if is desirable to secure the interior against tampering or contamination.

First cables 302 and 402 are shown as multi-fiber round cables. Alternatively, devices 300 and 400 may be adapted to receive first cables which are multi-fiber ribbon cables. The first cables 202, 302 and 402 may be terminated at an end opposite devices 200, 300 and 400, respectively, so that the optical fiber and the outer jacket are fixed with respect to each other at that end, such as shown in FIG. 4, above. Second cable 208 may be terminated at an end opposite device 200, as shown in FIG. 4, above. Second cables 308 and 408 may be each terminated by a connector, such as shown in FIG. 10.

Figure 27:
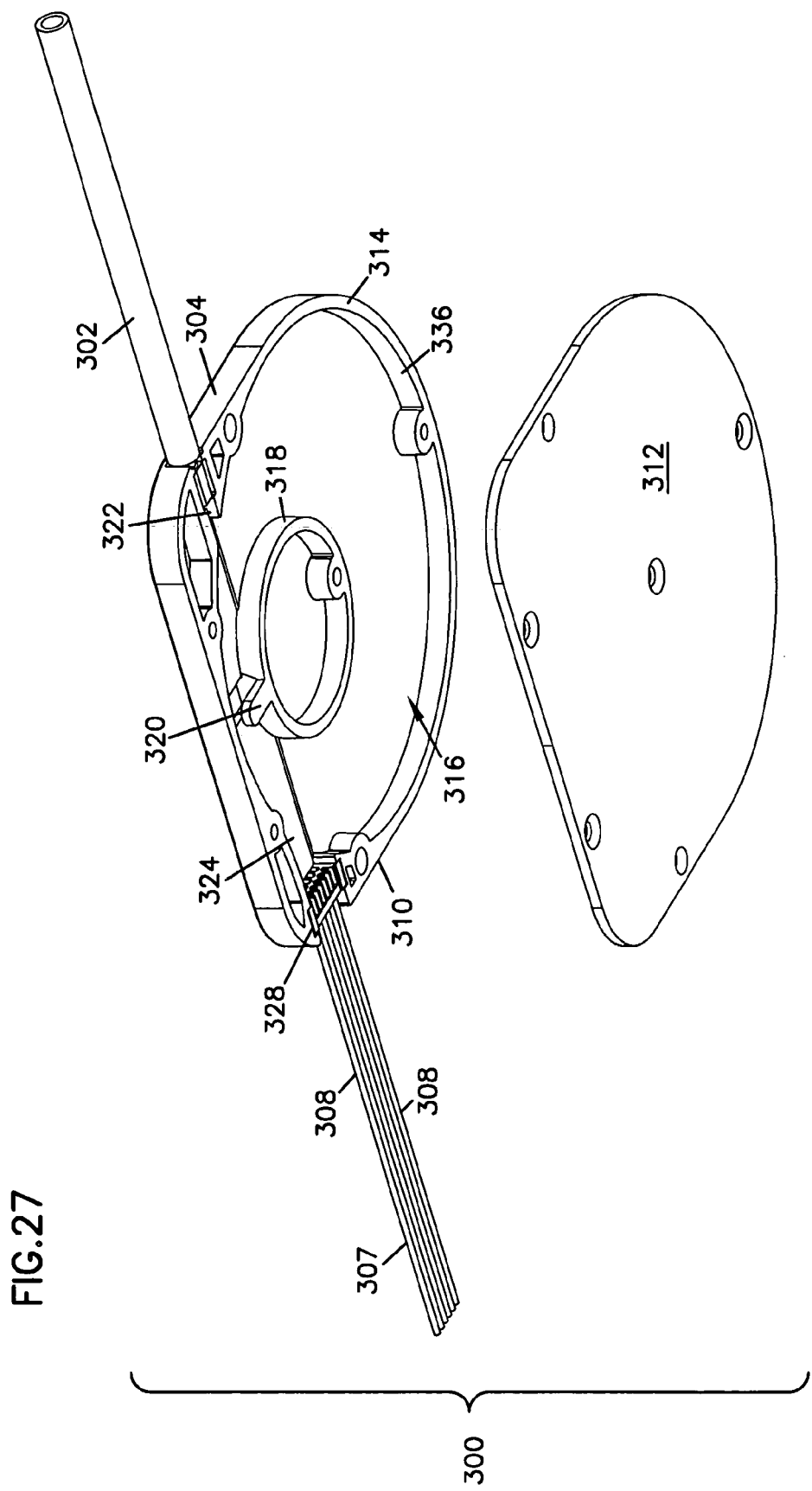
FIG. 27 is an exploded perspective view of the fiber optic device of FIG. 23.
Figure 28:
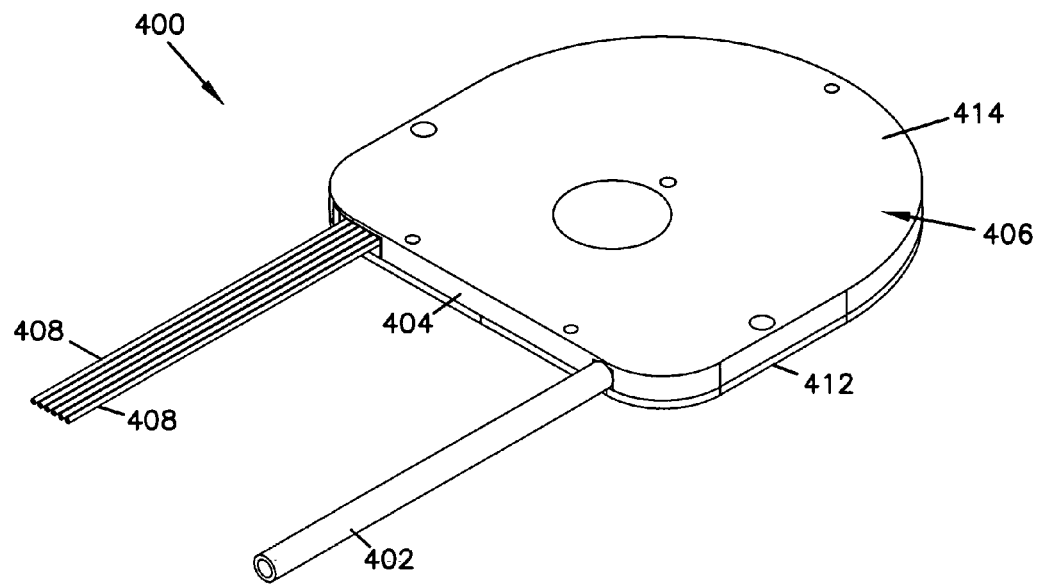
FIG. 28 is a perspective view of a second alternative embodiment of a fiber optic device with expansion chamber according to the present invention.
Figure 29:
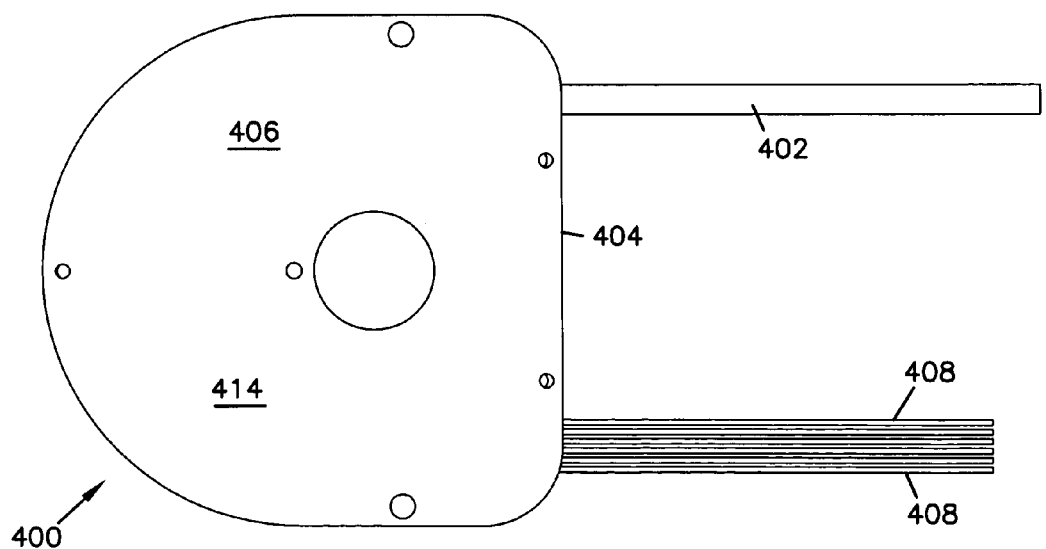
FIG. 29 is a top view of the fiber optic device of FIG. 28.

Referring now to FIGS. 26 and 27, fitting 326 includes a body with a first end adapted to be inserted within cable housing 301. The body also includes a second end adapted for positioning within opening 322 and a recess between the first and second ends to engage a mating portion of housing portion 314 and hold fitting 326 within opening 322. An axial channel defined longitudinally though body permits passage of fiber 303 from cable 302 into housing 306. First end may include one or more barbs or other ridges to aid body in gripping an inner wall of outer jacket 301.

Fitting 328 includes a body with a plurality of openings into which are extended ends of a plurality of outer jackets 307. Jackets 307 may be glued, crimped or otherwise mechanically fixed to fitting 328 so that fibers 330 can pass from within housing 306 though the openings while being continually protected by outer jackets 307. The body may include flanges extending along either or both of the top and bottom which may engage recesses within opening 324 to secure fitting 328 within opening 324.

The above specification, examples and data provide a complete description of the manufacture and use of the invention. Since many embodiments of the invention can be made without departing from the spirit and scope of the invention, the invention resides in the claims hereinafter appended.

What is claimed is as follows:

1. An optical fiber device comprising:
an optical fiber with a first end slidably enclosed within a first cable jacket and a second end slidably received within a second cable jacket, the first end of the fiber constrained from axial movement with respect to the first cable jacket and the second end of the fiber constrained from axial movement with respect to the second cable jacket;
wherein a fiber receiving device positioned between the first and second cable jackets permits the excess fiber length to accumulate without bending in a radius smaller than a minimum bend radius;
wherein the fiber receiving device includes a housing with a open sided body portion and a cover defining an interior, the first and second cable jackets extending to a side of the housing and the optical fiber passing through the interior of the housing between the first and second cable jackets, the open sided body portion defining a first cable opening and a second cable opening;

a first fitting mounted to an end of the first cable jacket and to the first cable opening of the open sided body portion, the end of the first jacket constrained from axial movement relative to the open sided body portion;

a second fitting mounted to an end of the second cable jacket and to the second cable opening of the open sided body portion, the end of the second jacket constrained from axial movement relative to the open sided body portion;

wherein the cover is mounted to the open sided body portion with removable fasteners;

wherein the optical fiber forms a loop within the interior;

wherein the fiber receiving device includes a central support within the interior, and wherein the loop of the optical fiber extends about the central support wherein the central support provides bend radius protection to the optical fiber;

wherein the first end of the optical fiber and the first cable jacket are constrained with respect to each other at a first optical fiber connector;

wherein the second end of the optical fiber and the second cable jacket are constrained with respect to each other at a second optical fiber connector.

2. The optical fiber device of claim 1, wherein a plurality of fibers extend within the first cable jacket and into the fiber receiving device, and a plurality of second cable jackets each receive one of the optical fibers from within the fiber receiving device.

3. The optical fiber device of claim 1, wherein the first cable opening and the second cable opening face in the same direction.

4. The optical fiber device of claim 1, wherein the first cable opening and the second cable opening face in opposite directions.

5. The optical fiber device of claim 2, wherein the first cable opening and the second cable opening face in the same direction.

6. The optical fiber device of claim 2, wherein the first cable opening and the second cable opening face in opposite directions.

7. An optical fiber device comprising:

an optical fiber with a first end slidably enclosed within a first cable jacket and a second portion not enclosed by the first cable jacket, the first end of the fiber constrained from axial movement with respect to the first cable jacket;

wherein a fiber receiving device positioned adjacent to the first cable jacket permits the excess fiber length to accumulate without bending in a radius smaller than a minimum bend radius;

wherein the fiber receiving device includes a housing with a open sided body portion and a cover defining an interior, the first cable jacket extending to a side of the housing and the optical fiber passing into the interior of the housing, the open sided body portion defining a first cable opening;

a first fitting mounted to an end of the first cable jacket and to the open sided body portion, the end of the first jacket constrained from axial movement relative to the open sided body portion;

wherein the cover is mounted to the open sided body portion with removable fasteners;

wherein the second portion of the optical fiber forms a loop within the interior;

wherein the fiber receiving device includes a central support within the interior, and wherein the loop of the optical fiber extends about the central support wherein the central support provides bend radius protection to the optical fiber;

wherein the first end of the optical fiber and the first cable jacket are constrained with respect to each other at a first optical fiber connector.

8. The optical fiber device of claim 1, wherein a plurality of fibers extend within the first cable jacket and into the fiber receiving device.

* * * * *